United States Patent
Jo et al.

(10) Patent No.: US 11,038,159 B2
(45) Date of Patent: Jun. 15, 2021

(54) POSITIVE ELECTRODE ACTIVE MATERIAL FOR LITHIUM SECONDARY BATTERY INCLUDING LITHIUM COBALT OXIDE HAVING CORE-SHELL STRUCTURE, METHOD FOR PRODUCING THE SAME, AND POSITIVE ELECTRODE AND SECONDARY BATTERY INCLUDING THE POSITIVE ELECTRODE ACTIVE MATERIAL

(71) Applicant: LG Chem, Ltd., Seoul (KR)

(72) Inventors: Chi Ho Jo, Daejeon (KR); Sungbin Park, Daejeon (KR); Jiyoung Park, Daejeon (KR); Bo Ram Lee, Daejeon (KR); Jungmin Han, Daejeon (KR); Hyuck Hur, Daejeon (KR); Wang Mo Jung, Daejeon (KR)

(73) Assignee: LG Chem, Ltd.

( * ) Notice: Subject to any disclaimer, the term of this patent is extended or adjusted under 35 U.S.C. 154(b) by 141 days.

(21) Appl. No.: 16/097,049

(22) PCT Filed: Jan. 26, 2018

(86) PCT No.: PCT/KR2018/001169
§ 371 (c)(1),
(2) Date: Oct. 26, 2018

(87) PCT Pub. No.: WO2018/143612
PCT Pub. Date: Aug. 9, 2018

(65) Prior Publication Data
US 2019/0148711 A1    May 16, 2019

(30) Foreign Application Priority Data

Jan. 31, 2017 (KR) .......... 10-2017-0013613
Jan. 31, 2017 (KR) .......... 10-2017-0013649

(51) Int. Cl.
*H01M 4/131* (2010.01)
*H01M 10/052* (2010.01)
(Continued)

(52) U.S. Cl.
CPC .......... *H01M 4/131* (2013.01); *C01G 51/006* (2013.01); *C01G 51/42* (2013.01); *H01M 4/36* (2013.01);
(Continued)

(58) Field of Classification Search
CPC ................................................ H01M 4/525
See application file for complete search history.

(56) References Cited

U.S. PATENT DOCUMENTS

2004/0200998 A1    10/2004  Park et al.
2011/0008678 A1     1/2011  Li et al.
(Continued)

FOREIGN PATENT DOCUMENTS

CN    101997113 A    3/2011
CN    102631875 A    8/2012
(Continued)

OTHER PUBLICATIONS

International Search Report for Application No. PCT/KR2018/001169 dated May 8, 2018.
(Continued)

*Primary Examiner* — Jonathan Crepeau
(74) *Attorney, Agent, or Firm* — Lerner, David, Littenberg, Krumholz & Mentlik, LLP

(57) ABSTRACT

The present invention relates to a positive electrode active material for a lithium secondary battery including a lithium cobalt oxide having a core-shell structure, wherein the lithium cobalt-doped oxide of the core and the lithium cobalt-doped oxide of the shell include each independently three kinds of dopants and satisfy specific conditions, a (Continued)

method for producing the same, and a positive electrode and a secondary battery containing the positive electrode active material.

15 Claims, 2 Drawing Sheets

(51) Int. Cl.
    *H01M 4/525*     (2010.01)
    *C01G 51/00*     (2006.01)
    *H01M 4/36*     (2006.01)
    *H01M 4/485*     (2010.01)
    *H01M 4/505*     (2010.01)

(52) U.S. Cl.
    CPC ........... *H01M 4/485* (2013.01); *H01M 4/505* (2013.01); *H01M 4/525* (2013.01); *H01M 10/052* (2013.01); *C01P 2002/52* (2013.01); *C01P 2004/84* (2013.01); *C01P 2006/40* (2013.01); *Y02E 60/10* (2013.01); *Y02T 10/70* (2013.01)

(56) References Cited

U.S. PATENT DOCUMENTS

| | | | |
|---|---|---|---|
| 2011/0076564 A1 | 3/2011 | Yu et al. | |
| 2011/0171529 A1* | 7/2011 | Kono | H01M 4/485 429/223 |
| 2013/0022869 A1 | 1/2013 | Yi | |
| 2014/0087257 A1 | 3/2014 | Gopukumar et al. | |
| 2014/0124701 A1 | 5/2014 | Vanhatalo et al. | |
| 2016/0156032 A1 | 6/2016 | Lee et al. | |
| 2016/0181597 A1 | 6/2016 | Kim et al. | |
| 2016/0181610 A1 | 6/2016 | Shim et al. | |
| 2016/0315320 A1 | 10/2016 | Matsuda | |
| 2016/0322633 A1 | 11/2016 | Kim et al. | |
| 2017/0222211 A1 | 8/2017 | Ryu et al. | |
| 2017/0222221 A1 | 8/2017 | Park et al. | |
| 2017/0222225 A1 | 8/2017 | Kang et al. | |
| 2017/0309891 A1 | 10/2017 | Matsui et al. | |
| 2018/0190976 A1 | 7/2018 | Blangero et al. | |
| 2018/0226678 A1* | 8/2018 | Haruna | H01M 4/505 |

FOREIGN PATENT DOCUMENTS

| | | |
|---|---|---|
| CN | 103367704 A | 10/2013 |
| CN | 103794776 B | 3/2016 |
| CN | 105453311 A | 3/2016 |
| CN | 105958038 A | 9/2016 |
| CN | 106207138 A | 12/2016 |
| EP | 2940761 A1 | 11/2015 |
| EP | 2963705 A1 | 1/2016 |
| JP | 2004002141 A | 1/2004 |
| JP | 2008120679 A | 5/2008 |
| JP | 4465264 B2 | 5/2010 |
| JP | 2010135187 A | 6/2010 |
| JP | 2011096626 A | 5/2011 |
| JP | 2013182782 A | 9/2013 |
| JP | 2013541819 A | 11/2013 |
| JP | 2014523383 A | 9/2014 |
| JP | 2016105366 A | 6/2016 |
| JP | 2016110889 A | 6/2016 |
| JP | 2018524776 A | 8/2018 |
| KR | 20010047852 A | 6/2001 |
| KR | 100300330 B1 | 9/2001 |
| KR | 101392800 B1 | 5/2014 |
| KR | 20150042730 A | 4/2015 |
| KR | 101534896 B1 | 7/2015 |
| KR | 101553137 B1 | 9/2015 |
| KR | 20160039983 A | 4/2016 |
| KR | 20160040116 A | 4/2016 |
| KR | 20160040117 A | 4/2016 |
| KR | 20160049995 A | 5/2016 |
| KR | 20160064881 A | 6/2016 |
| KR | 20160098315 A | 8/2016 |
| KR | 20160127991 A | 11/2016 |
| WO | 2010150038 A1 | 12/2010 |
| WO | 2016107237 A1 | 7/2016 |

OTHER PUBLICATIONS

Japanese Notice of Opposition for Application No. 2018548046 dated Mar. 17, 2020, 19 pages, translation not available.
McGraw-Hill, Dictionary of Scientific and Technical Terms Fifth Edition, 1989, pp. 1287-1288 and 1575, translation not available.
Extended European Search Report including Written Opinion for Application No. EP18748698.0, dated Jul. 11, 2019, pp. 1-7.
Search Report from 1st Office Action for Chinese Application No. 201880001796.9 dated Feb. 3, 2021; 3 pages.

* cited by examiner

【FIG. 1a】
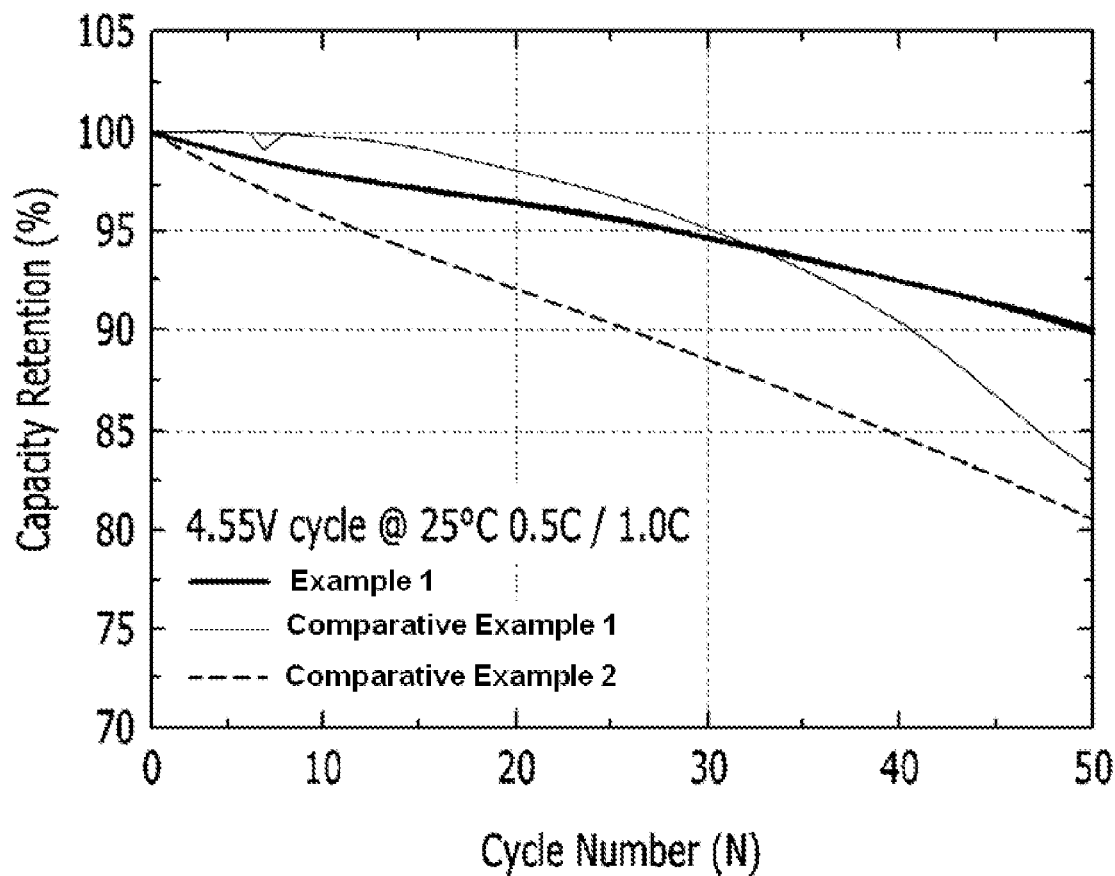

[FIG. 1b]
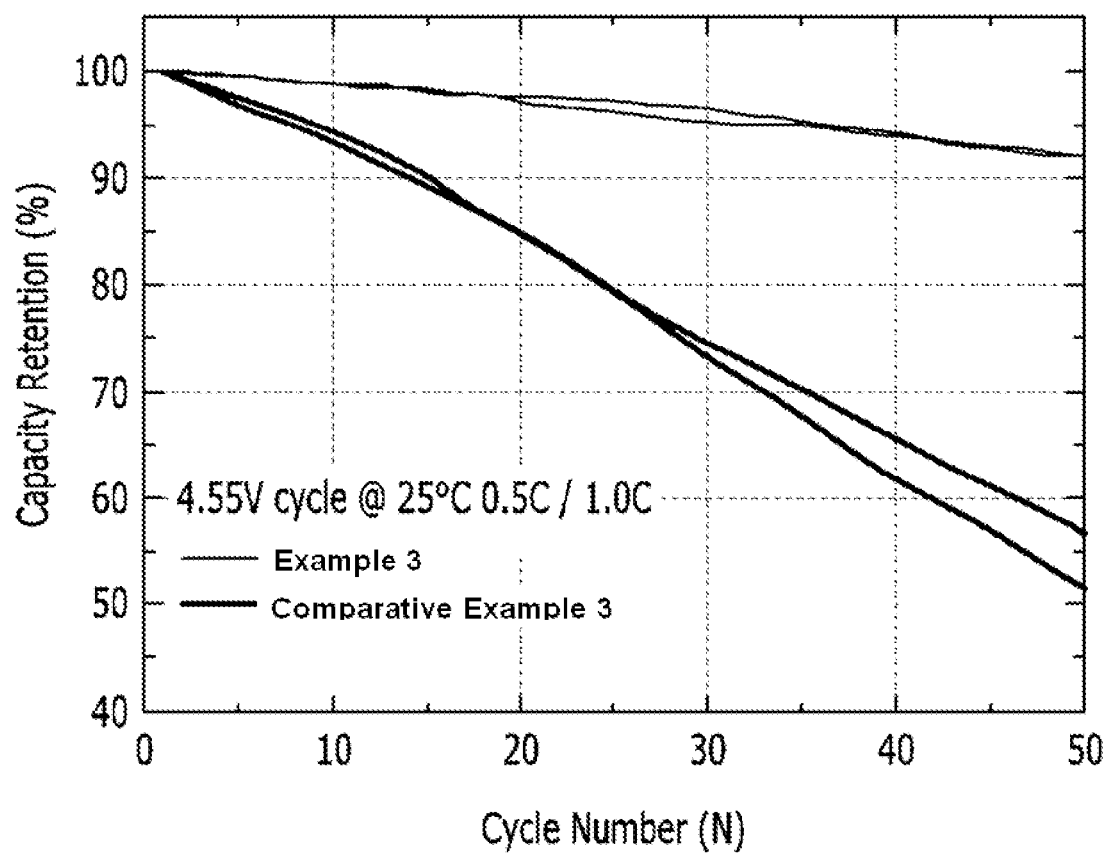

POSITIVE ELECTRODE ACTIVE MATERIAL FOR LITHIUM SECONDARY BATTERY INCLUDING LITHIUM COBALT OXIDE HAVING CORE-SHELL STRUCTURE, METHOD FOR PRODUCING THE SAME, AND POSITIVE ELECTRODE AND SECONDARY BATTERY INCLUDING THE POSITIVE ELECTRODE ACTIVE MATERIAL

CROSS-REFERENCE TO RELATED APPLICATIONS

This application is a national phase entry under 35 U.S.C. § 371 of International Application No. PCT/KR2018/001169, filed Jan. 26, 2018, which claims priority to Korean Patent Application No. 10-2017-0013613, filed Jan. 31, 2017, and Korean Patent Application No. 10-2017-0013649, filed Jan. 31, 2017, the disclosures of which are incorporated herein by reference.

TECHNICAL FIELD

The present invention relates to a positive electrode active material for a lithium secondary battery including a lithium cobalt oxide having a core-shell structure, and to a method for producing the same.

BACKGROUND ART

According to technological development and increased demand for mobile devices, demand for using secondary batteries as energy sources has rapidly increased. Among such secondary batteries, lithium secondary batteries having high energy density and operation potential, long cycle life, and low self-discharge rate are commercially available and widely used.

In addition, increased interest in environmental issues has led to a great deal of research into electric vehicles, hybrid electric vehicles or the like as alternatives to vehicles using fossil fuels such as gasoline vehicles and diesel vehicles. These electric vehicles and hybrid electric vehicles generally use nickel-metal hydride secondary batteries as power sources. However, a great deal of study associated with lithium secondary batteries with high energy density and discharge voltage is currently underway and some are commercially available.

Currently, $LiCoO_2$, ternary system (NMC/NCA), $LiMnO_4$, $LiFePO_4$, etc. are used as the positive electrode active material for lithium secondary battery. Among them, $LiCoO_2$ clearly has advantages such as high rolling density, and thus a number of $LiCoO_2$ is widely used up to now. In order to develop high capacity secondary batteries, research to raise the working voltage has currently proceeded. However, $LiCoO_2$ has a low charging/discharging current amount which is about 150 mAh/g. At a voltage of 4.3 V or more, there is a problem that the crystal structure is unstable and the lifetime characteristics are rapidly deteriorated. Further, it has a risk of ignition due to reaction with an electrolyte.

In order to solve these problems, a technique of doping a metal such as Al, Ti, Mg, or Zr to the $LiCoO_2$ or a technology of coating a metal such as Al, Ti, Mg, or Zr onto the surface of $LiCoO_2$ has been conventionally used. However, these prior art references disclose only a method of doping the doping elements within 50 ppm to 8000 ppm. Thus, there is still a problem that the structural stability cannot be maintained yet at a high voltage exceeding 4.5 V.

In the case of the coating layer made of the metal, it interrupts the transfer of Li ions during charging and discharging, decreases the capacity of $LiCoO_2$, rather deteriorates the performance of the secondary battery, and still has problems in stability and life characteristics at high temperature and high voltage.

Therefore, there is a high necessity for the development of a positive electrode active material based on lithium cobalt oxide having high lifetime characteristics and enhanced stability even under high temperature and high voltage environment.

DETAILED DESCRIPTION OF THE INVENTION

Technical Problem

The present invention has been made to solve the above problems and other technical problems that have yet to be resolved.

As a result of a variety of extensive and intensive studies and experiments, the present inventors have developed that when a lithium cobalt-doped oxide of a core and a lithium cobalt-doped oxide of a shell include each independently three kinds of dopants and the dopants satisfy a specific condition as described below, the structural stability of the crystal structure is improved even in the operation voltage range exceeding 4.5 V, the crystal structure is maintained, and high-voltage characteristics are exhibited, thereby completing the present invention.

Technical Solution

Therefore, the positive electrode active material for a secondary battery according to the present invention is a positive electrode active material for a lithium secondary battery including a lithium cobalt-doped oxide having a core-shell structure, characterized in that the lithium cobalt-doped oxide of the core and the lithium cobalt-doped oxide of the shell include each independently three kinds of dopants and satisfy the following (a) or (b):

(a) the ratio between the average oxidation number of the dopants present in the core and the average oxidation number of the dopants present in the shell satisfies the following condition (1);

$$0.7 \leq t(\text{ratio}) = OC/OS < 0.95 \tag{1}$$

wherein, OC is the average oxidation number of the dopants present in the core, and OS is the average oxidation number of the dopants present in the shell, or (b) the dopants of the core are a metal (M1) having an oxidation number of +2, a metal (M2) having an oxidation number of +3 and a metal (M3) having a oxidation number of +4, the contents of M1, M2, and M3 satisfy the following condition (2) based on the molar ratio; the dopants of the shell are a metal (M1') having an oxidation number of +2, a metal (M2') having an oxidation number of +3 and a metal (M3') having a oxidation number of +4, and the contents of M1', M2' and M3' satisfy the following condition (3) based on the molar ratio.

$$2 \leq r(\text{molar ratio}) = CM1/(CM2+CM3) \leq 3 \tag{2}$$

$$0.5 \leq r'(\text{molar ratio}) = CM1'/(CM2'+CM3') < 2 \tag{3}$$

wherein CM1 is the content of M1, CM2 is the content of M2, CM3 is the content of M3, CM1' is the content of M1', CM2' is the content of M2', and CM3' is the content of M3'.

In general, when lithium cobalt oxide for battery operation of 4.35 V, 4.4 V and 4.45 V is used as the positive electrode active material at high voltage, the lithium cobalt oxide has been doped or coated with Al, Ti, Zr, Mg, P, Ca, F, Co and the like to achieve structural durability and surface stability in high voltage environment. Specifically, in the lithium cobalt oxide, while oxidizing $Co^{3+}$ to $Co^{4+}$ in a state where x<50 in $Li_xCoO_2$ due to its essential properties, a structural stress is increased due to the small ionic radius of $Co^{4+}$, and then reduced close to x=20 by charging. In this case, a structural change from the O3 structure to H1-3 structure is generated at 4.53 V on the basis of a coin half-cell voltage. Such structural change is irreversibly generated during charging and discharging, and disadvantages in the efficiency, discharge rate characteristic, and lifetime characteristic are remarkably confirmed at 4.55 V or higher. Of course, in the conventional cell development from 4.2 V to 4.45 V, charging and discharging were performed without significant change from the O3 structure (of course, there is a change to the mono-clinic phase, but it is reversible and has no influence on the lifetime). However, there arises a problem that the structural change to the H1-3 should be prevented for the battery operation of 4.5V or more.

In this regard, as a result of extensive and intensive studies, the present inventors have found that a lithium cobalt-doped oxide having a core-shell structure wherein the lithium cobalt-doped oxide of the core and the lithium cobalt-doped oxide of the shell each have three kinds of dopants having different oxidation numbers, and wherein their average oxidation numbers are adjusted so that the average oxidation ratio of the dopants doped to the core and the shell is within the above range, thereby satisfying the condition (1), or the content ratio of the dopants is adjusted to thereby satisfy the conditions (2) and (3), suppresses a change of the surface structure under high temperature and high voltage, improves the structural stability of the positive electrode active material particle, and thus significantly improves the life characteristic.

In the present specification, the driving voltage was created on the basis of a half coin cell.

Here, when t (ratio) deviates from the range of condition (1) and when the r (molar ratio) or r'(molar ratio) deviates from the condition (2) or the condition (3), irreversible changes in the crystal structure occur frequently, inferiority is exhibited in the lifetime characteristics, and thus the effect intended by the present invention cannot be obtained.

More specifically, t (ratio) in the condition (1) can satisfy the condition of 0.8≤t<0.95, r(molar ratio) in the conditions (2) and (3) can satisfy the condition of 2≤r≤2.5, and r'(molar ratio) can satisfy the condition of 0.5≤r'≤1.5.

In the lithium cobalt-doped oxide of the core-shell structure satisfying these conditions, the crystal structure can be maintained without phase change in the range where the positive electrode potential during full charge is higher than 4.5 V on the basis of a Li potential.

First, the lithium cobalt-doped oxide of the core may have a composition of the following Chemical Formula (1).

$$Li_aCo_{1-x-y-z}M1_xM2_yM3_zO_2 \quad (1)$$

wherein,

M1, M2 and M3 are each independently one element selected from the group consisting of Ti, Mg, Al, Zr, Ba, Ca, Ta, Nb, Mo, Ni, Zn, Si, V and Mn;

0.95≤a≤1.05;

0<x≤0.04, 0<y≤0.04, and 0<z≤0.04.

Similarly, the lithium cobalt-doped oxide of the shell may have a composition of the following Chemical Formula (2).

$$Li_bCo_{1-s-t-w}M1'_sM2'_tM3'_wO_2 \quad (2)$$

wherein,

M1', M2' and M3' are each independently one element selected from the group consisting of Ti, Mg, Al, Zr, Ba, Ca, Ta, Nb, Mo, Ni, Zn, Si, V and Mn;

0.95≤b≤1.05;

0<s≤0.04, 0<t≤0.04, and 0<w≤0.04.

Specifically, it may be 0<x≤0.02, 0<y≤0.02, and 0<z≤0.02, 0<s≤0.02, 0<t≤0.02, and 0<w≤0.02.

That is, as shown by the above formula, the composition formulas of the core and the shell are all in a form in which three kinds of dopants are doped in the cobalt site, and the kind and doping amount of the doping element are not largely changed. However, when the lithium cobalt-doped oxide of the core-shell structure according to the present invention satisfies the conditions (2) and (3) of the above (b), in terms of the content ratio, the core has a higher content of +4 and +3 relative to +2 than the shell.

Therefore, as can be seen from the above, the concept of the shell is not a separate phase which is distinguished and completely independent from the core, but it can be seen as the same concept as the one surface-doped by changing composition and/or content. In this regard, if it is an extent that the core and the shell can be distinguished from each other, the surface-doped configuration is also included in the scope of the present invention.

At this time, the thickness of the shell having a difference in composition distinguished from the core may be 50 to 2000 nm, and specifically, 50 to 200 nm.

If the thickness of the shell is too thick beyond the above range, the resistance may become large due to the influence of the shell having a high resistance, and there is a problem that resistance characteristics and rate characteristics may be negative due to disconnection of the transfer path of Li ion. If the thickness of the shell is too thin, the high voltage stability due to the shell may not be guaranteed, which is not preferable.

Meanwhile, all the kinds of dopants to be substituted in the cobalt sites of the core and the shell may be the same (M1=M1', M2=M2', M3=M3') or different (M1≠M1'≠ M2≠M2' ≠M3≠M3'), and some thereof may be the same, for example M1=M1', M2=M2', M3≠M3', and any combination thereof is possible, but is not limited to the above examples.

In addition, the dopants are selected from dopants such as those listed in Chemical Formulas (1) and (2). Specifically, each of the dopants substituted in the cobalt sites of the core and the shell may have different oxidation numbers. Specifically, M1 and M1' are a metal having an oxidation number of +2, M2 and M2' are metals having an oxidation number of +3, and M3 and M3' are metals having an oxidation number of +4.

Thus, when the dopants doped to the core and the shell have oxidation numbers that are different from other elements doped together so that all dopants have the oxidation numbers of +2, +3 and +4, it may be further advantageous for the structural stability intended by the present invention.

Specifically, in the case of a metal having an oxidation number of +2, the doped metal is oxidized earlier than $Co^{3+}$ to prevent the oxidation to $Co^{4+}$, thereby preventing the occurrence of structural stress and improving the structural stability. A metal having an oxidation number of +3 serves to maintain the structure instead of cobalt oxidized to $Co^{4+}$ and also increase surface stability. A metal having an oxidation number of +4 suppresses changes of the surface structure under high temperature and high voltage, relatively easily transfers lithium ions, and prevents the deterioration of output characteristics of the secondary battery. The combination of such dopants enables the lithium cobalt-doped oxide according to the present invention to maintain structural stability even in the operation range of higher than 4.5V.

That is, the dopants having different oxidation numbers doped to each of the above are partially substituted for the cobalt sites of the lithium cobalt oxide, and thus serve to improve the structural safety according to the respective time and situation.

At this time, the metals M1 and M1' having an oxidation number of +2 are each independently one element selected from the group consisting of Mg, Ca, Ni and Ba; the metals M2 and M2' having an oxidation number of +3 are each independently one element selected from the group consisting of Ti, Al, Ta and Nb; the metals M3 and M3' having an oxidation number of +4 are each independently selected from the group consisting of Ti, Ta, Nb, Mn and Mo and may be elements different from M2 and M2'. More specifically, the metal (M1) having an oxidation number of +2 may be Mg, the metal (M2) having an oxidation number of +3 may be Ti or Al, and the metal (M3) of an oxidation number of +4 may be Ti, Nb or Mo.

Moreover, although all of these dopants are included in an excessive amount, they does not result in a continued increase in structural stability. When the average oxidation number ratio of the core and the shell satisfies the above condition (1) while the total amount of the dopants doped does not exceed 12%, particularly 6%, based on the molar ratio in each of the core and the shell, or when the content ratio thereof satisfies the above conditions (2) and (3), improved structural stability can be exhibited as described above.

Meanwhile, each of the above dopants can be uniformly doped throughout the core and shell of the lithium cobalt-doped oxide, in order to prevent local structural changes in the particle, but not limited thereto.

Further, in order to further improve the stabilization of the surface structure of the lithium cobalt-doped oxide, $Al_2O_3$ having a thickness of 50 nm to 100 nm may be coated onto the surface of the lithium cobalt-doped oxide.

Further, the present invention provides a method for producing a lithium cobalt-doped oxide having a core-shell structure of a positive electrode active material, wherein the method may include the steps of:

(i) preparing a doped cobalt precursor containing three kinds of dopants by co-precipitation;

(ii) mixing the doped cobalt precursor and a lithium precursor, and subjecting them to a primary calcination to prepare core particles; and (iii) mixing the core particles, the cobalt precursor, the lithium precursor, and the three kinds of dopant precursors, and subjecting them to a secondary calcination to form a shell on the core particle surface, thereby preparing a lithium cobalt-doped oxide having a core-shell structure.

According to the above production method, in order to produce a core, the lithium cobalt-doped oxide having the core-shell structure is subjected to a process of first preparing a doped cobalt precursor containing dopants by co-precipitation, and subsequently calcinating the doped cobalt precursor and the lithium precursor. Thus, after doping on the cobalt precursor itself is performed during the production of the core, it is produced by reaction with the lithium precursor. Therefore, the dopant can react with the lithium precursor in a state evenly distributed in cobalt, which has few by-products. Thus, the yield of the lithium cobalt-doped oxide containing the dopant to be obtained by the present invention is high.

Here, in the step (i), dopant element-containing salts and cobalt salts are dissolved in water, and then the solution is converted to a basic atmosphere and subjected to a co-precipitation to prepare a doped cobalt oxide as the doped cobalt precursor. In this case, the content of the salts containing the dopant element and the content of the cobalt salts can be determined in consideration of the composition of the core, which is a final product.

Particularly, when designed so as to satisfy the conditions (2) and (3) of the above (b), the salts containing the dopant element in the step (i) are a salt containing a metal (M1) having an oxidation number of +2, a metal (M2) having an oxidation number of +3 and a metal (M3) having an oxidation number of +4, and the mixing ratio of the salts may be determined so as to satisfy the following condition (2).

$$2 \leq r(\text{molar ratio}) = CM1/(CM2+CM3) \leq 3 \quad (1)$$

wherein, CM1 is the content of M1, CM2 is the content of M2, and CM3 is the content of M3.

The dopant element-containing salts and cobalt salts for preparing the doped cobalt precursor of the step (i) are not limited as long as they are in a form capable of performing the co-precipitation process. For example, they may be in the form of a carbonate, a sulfate, or a nitrate, and in particular, a sulfate.

In the step (iii), the content of the cobalt precursor, the lithium precursor, and the three kinds of dopant precursors can be determined in consideration of the composition of the shell.

In particular, when designed so as to satisfy the conditions (2) and (3) of the above (b), the three kinds of dopant precursors in the step (iii) are a precursor containing a metal (M1') having an oxidation number of +2, a precursor containing a metal (M2') having an oxidation number of +3, and a precursor containing a metal (M3') having an oxidation number of +4, and the mixing ratio of said precursors can be determined so as to satisfy the following condition (2).

$$0.5 \leq r(\text{molar ratio}) = CM1'/(CM2'+CM3') \leq 3 \quad (1)$$

wherein, CM1' is the content of M1', CM2' is the content of M2', and CM3' is the content of M3'.

Meanwhile, when designed so as to satisfy the condition (1) of the above (a), in the steps (i) and (iii) the dopants may be mixed so as to satisfy the condition (1).

Furthermore, in order to additionally coat a metal onto the lithium cobalt-doped oxide, for example, the method can be performed by dry-mixing or wet-mixing an oxide such as $Al_2O_3$, and it is not limited as long as it is a method disclosed in the related art.

Further, the present invention provides a method for producing a lithium cobalt-doped oxide having a core-shell structure of the positive electrode active material, and specifically, the method may include the steps of:

(i) mixing a cobalt precursor, a lithium precursor, and three kinds of dopant precursors and subjecting them to a primary calcination to prepare core particles; and (ii) mixing the core particles, the cobalt precursor, the lithium precursor, and the three kinds of dopant precursors independently of said step (i), and subjecting them to a secondary calcination to form a shell on the core particle surface, thereby preparing a lithium cobalt-doped oxide having a core-shell structure.

According to the production method, the cobalt precursor, the lithium precursor, and the dopant precursors are mixed from the core to the shell at once and calcinated, and thus a lithium cobalt-doped oxide can be produced in a more convenient manner.

At this time, in the respective steps, the mixing ratio of the dopant precursors, the cobalt precursor, and the lithium precursor can be determined in consideration of the final product.

In particular, when designed so as to satisfy the condition (1) of the above (a), the mixing ratio of the dopant precursors in the steps (i) and (iii) may be set so as to satisfy the condition (1). Alternatively, when designed so as to satisfy the conditions (2) and (3) of the above (b), the mixing ratio of the three kinds of dopant precursors in the respective steps be set so as to satisfy the conditions (2) and (3).

Meanwhile, a lithium cobalt-doped oxide having the core-shell structure of the present invention can be produced by any of the above methods, wherein the cobalt precursor may be a cobalt oxide, for example, $Co_3O_4$, wherein the dopant precursors may be a metal, metal oxide or metal salt for dopant, and wherein the lithium precursor is not limited, but specifically, it may be at least one selected from the group consisting of LiOH and $Li_2CO_3$.

As described above, the dopants of the three kinds of dopant precursors are used for exhibiting more improved structural stability in various ways at high voltage, specifically, they may have different oxidation numbers, and more specifically, they may be a metal having an oxidation number of +2, a metal having an oxidation number of +3, and a metal having an oxidation number of +4.

Meanwhile, the primary calcination for obtaining the lithium cobalt-doped oxide of the core is performed at a temperature of 850° C. to 1100° C. for 8 to 12 hours, and the secondary calcination for forming the shell is performed at a temperature of 700° C. to 1100° C. for 5 to 12 hours.

When the primary calcination is performed at an excessively low temperature beyond the above range or when it is performed for an excessively short time, there is a possibility that the lithium source does not sufficiently permeate and the positive electrode active material may not be stably formed. Conversely, when the primary calcination is performed at an excessively high temperature beyond the above range or when it is performed for an excessively long time, the physical and chemical properties of the doped lithium cobalt-based oxide can be changed to induce a deterioration of performance, which is not preferable.

Similarly, when the secondary calcination is performed at an excessively low temperature beyond the above range, or for an excessively short time, the precursors constituting the shell may remain between the positive electrode active materials without reacting, and thus the deterioration of the performance of the battery can be induced. Conversely, when the secondary calcination is performed at an excessively high temperature beyond the above range or for an excessively long time, the dopant component of the shell can be doped to the core portion. In this case, it is difficult to produce so that the above conditions (1) to (3) are satisfied, which is not preferable. The resulting lithium cobalt-doped oxide having the core-shell structure satisfies the above conditions (a) or (b) and exhibits the effect intended by the present invention.

The present invention also provides a positive electrode in which a positive electrode mixture containing the positive electrode active material, a conductive material, and a binder is applied to a current collector. If necessary, the positive electrode material mixture may further include a filler.

The positive electrode current collector is generally manufactured with a thickness of 3 to 500 µm, and is not particularly limited as long as it has high conductivity without inducing a chemical change in the battery. For example, one selected from those surface-treated with carbon, nickel, titanium or silver onto stainless steel, aluminum, nickel, titanium, and aluminum or stainless steel surface may be used. Specifically, aluminum may be used. The current collector may form fine irregularities on its surface to increase the adhesive force of the positive electrode active material, and various forms such as a film, a sheet, a foil, a net, a porous body, a foam, a nonwoven fabric body, etc. are available.

In addition to the positive electrode active material particles, the positive electrode active material may be composed of, for example, a layered compound such as lithium nickel oxide ($LiNiO_2$) or a compound substituted with one or more transition metals; lithium manganese oxides such as the formula $Li_{1+x}Mn_{2-x}O_4$ (where x is 0 to 0.33), $LiMnO_3$, $LiMn_2O_3$, $LiMnO_2$ and the like; lithium copper oxide ($Li_2CuO_2$); vanadium oxides such as $LiV_3O_8$, $LiV_3O_4$, $V_2O_5$, $Cu_2V_2O_7$ and the like; a Ni-site type lithium nickel oxide represented by the formula $LiNi_{1-x}M_xO_2$ (where M=Co, Mn, Al, Cu, Fe, Mg, B or Ga and x=0.01 to 0.3); lithium manganese complex oxide represented by the formulae $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ in which a part of Li in the formula is substituted with an alkaline earth metal ion; a disulfide compound; $Fe_2(MoO_4)_3$, and the like, but are not limited thereto.

The conductive material is usually added in an amount of 1 to 30% by weight based on the total weight of the positive electrode mixture containing the positive electrode active material. Such a conductive material is not particularly limited as long as it has electrical conductivity without inducing a chemical change in the battery. For example, graphite such as natural graphite or artificial graphite; carbon blacks such as carbon black, acetylene black, Ketjenblack, channel black, furnace black, lamp black, and summer black; conductive fibers such as carbon fiber and metal fiber; metal powders such as fluorinated carbon, aluminum, and nickel powder; conductive whiskey such as zinc oxide and potassium titanate; conductive metal oxides such as titanium oxide; conductive materials such as polyphenylene derivatives and the like can be used.

The binder is a component that assists in bonding between the active material and the conductive material and bonding to the current collector, and is usually added in an amount of 1 to 30% by weight based on the total weight of the mixture containing the positive electrode active material. Examples of such binders include polyvinylidene fluoride, polyvinyl alcohol, carboxymethylcellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, various copolymers and the like.

The filler is optionally used as a component for inhibiting the expansion of the positive electrode. The filler is not particularly limited as long as it is a fibrous material without inducing a chemical change in the battery. For example, olefin-based polymers such as polyethylene and polypropylene; fibrous materials such as glass fibers and carbon fibers are used.

The present invention further provides a secondary battery including a positive electrode, specifically, a secondary battery including the positive electrode and negative electrode, and an electrolyte. The kind of the secondary battery is not particularly limited, but as a specific example, it may be a lithium secondary battery such as a lithium ion battery, a lithium ion polymer battery or the like, which has advantages such as high energy density, discharge voltage, and output stability.

Generally, a lithium secondary battery is composed of a positive electrode, a negative electrode, a separator, and a lithium salt-containing non-aqueous electrolyte solution.

Hereinafter, other components of the lithium secondary battery will be described.

The negative electrode is fabricated by applying and drying a negative electrode active material onto a negative electrode current collector, and if necessary, the above-described components may optionally be further included.

The negative electrode current collector is generally produced to have a thickness of 3 to 500 micrometers. The negative electrode current collector is not particularly limited as long as it has electrical conductivity without inducing a chemical change in the battery. For example, those surface-treated with carbon, nickel, titanium or silver onto copper, stainless steel, aluminum, nickel, titanium, calcinated carbon, copper or stainless steel surface, aluminum-cadmium alloys and the like can be used. Further, similarly to the positive electrode current collector, it is possible to enhance the bonding force of the negative electrode active material by forming fine irregularities on the surface. It can be used in various forms such as a film, a sheet, a foil, a net, a porous body, a foam, a nonwoven fabric body, and the like.

The negative electrode active material may be, for example, carbons such as hardly graphitizable carbon, or graphite carbon; metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, Group 2, Group 3 elements of the periodic table, halogen; $0 < x \leq 1$; $1 \leq y \leq 3$; $1 \leq z \leq 8$); lithium metal; lithium alloy; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials and the like can be used.

The separator is interposed between the positive electrode and the negative electrode, and an insulating thin film having high ion permeability and mechanical strength is used. The pore diameter of the separator is generally 0.01 to 10 micrometers, and the thickness is generally 5 to 30 micrometers. As such separator, for example, olefin-based polymers such as polypropylene, which is chemically resistant and hydrophobic; sheets or nonwoven fabrics made of glass fiber, polyethylene or the like are used. When a solid electrolyte such as a polymer is used as the electrolyte, the solid electrolyte may also serve as a separator.

The electrolyte may be a lithium salt-containing non-aqueous electrolyte, and the lithium salt-containing non-aqueous electrolyte is composed of a non-aqueous electrolyte and a lithium salt. Examples of the non-aqueous electrolyte include a non-aqueous organic solvent, an organic solid electrolyte, an inorganic solid electrolyte, and the like, but are not limited thereto.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyltetrahydrofuran, dimethyl sulfoxide, 1,3-dioxolane, formamide, dimethylformamide, dioxolane, acetonitrile, nitromethane, methyl formate, methyl acetate, phosphate triester, trimethoxymethane, dioxolane derivative, sulfolane, methyl sulfolane, 1,3-dimethyl-2-imidazolidinone, propylene carbonate derivative, tetrahydrofuran derivative, ether, methyl pyrophosphate, ethyl propionate and the like may be used.

As the organic solid electrolyte, for example, polyethylene derivative, polyethylene oxide derivative, polypropylene oxide derivative, phosphate ester polymer, poly agitation lysine, polyester sulfide, polyvinyl alcohol, polyvinylidene fluoride, a polymer containing an ionic dissociation group, and the like may be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$ may be used.

The lithium salt is a substance which can be dissolved in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide and the like may be used.

In addition, for the purpose of improving charge-discharge characteristics, flame retardancy, etc., for example, pyridine, triethyl phosphite, triethanolamine, cyclic ether, ethylenediamine, n-glyme, hexaphosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, aluminum trichloride and the like may be added as the non-aqueous electrolyte. In some cases, in order to impart nonflammability, a halogen-containing solvent such as carbon tetrachloride, ethylene tetrafluoride and the like may be further included. In order to improve high-temperature storage characteristics, carbon dioxide gas may be further included, and FEC (Fluoro-Ethylene Carbonate), PRS (Propene Sultone) and the like may be further included.

In one specific example, a lithium salt such as $LiPF_6$, $LiClO_4$, $LiBF_4$, or $LiN(SO_2CF_3)_2$ is added to a mixed solvent of a cyclic carbonate of EC or PC which is a high-dielectric solvent and a linear carbonate of DEC, DMC or EMC which is a low viscosity solvent, thereby producing a non-aqueous electrolyte containing a lithium salt.

BRIEF DESCRIPTION OF DRAWINGS

FIGS. 1a and 1b are a graph showing the capacity retention when charged at 25° C. at an upper limit voltage of 4.55 V according to Experimental Example 1.

DETAILED DESCRIPTION OF THE EMBODIMENTS

Hereinafter, the present invention is described with reference to Examples, but these examples are provided for better understanding of the invention, and are not intended to limit the scope of the present invention thereto.

Preparation of Core

Preparation Example 1

$Co_3O_4$ and $Li_2CO_3$ were dry-mixed so as to have a composition of 4 mol of MgO, 1 mol of $Al_2O_3$, and 1 mol of $TiO_2$, and then calcined at 1,050° C. for 10 hours in a furnace to obtain a lithium cobalt-doped oxide $Li_{1.02}Co_{0.94}Mg_{0.04}Al_{0.01}Ti_{0.01}O_2$ doped with Mg, Al and Ti.

Preparation Example 2

$Co_3O_4$ and $Li_2CO_3$ were dry-mixed so as to have a composition of 0.6 mol of MgO, 4 mol of $Al_2O_3$, and 1 mol of $TiO_2$, and then calcined at 1,050° C. for 10 hours in a furnace to obtain a lithium cobalt-doped oxide $Li_{1.02}Co_{0.944}Mg_{0.006}Al_{0.04}Ti_{0.01}O_2$ doped with Mg, Al and Ti.

Preparation Example 3

A precursor particle of $(Co_{0.94}Mg_{0.04}Al_{0.01}Ti_{0.01})(OH)_2$ was obtained by dispersing in a mixed aqueous solution in which $Co_3(SO_4)_4$, sodium sulfate ($MgSO_4$), aluminum sulfate ($Al_2(SO_4)_3$) and titanium sulfate ($Ti(SO_4)_2$) were mixed at a ratio of Co Mg:Al:Ti=0.94:0.04:0.01:0.01, and co-precipitating the result using sodium hydroxide.

41 g of $LiOH.H_2O$ was added to 100 g of the precursor so that the molar ratio of the total elements in the particle became the molar ratio of Li:M (Co, Mg, Al, Ti)=1.02:1, and then mixed with a zirconia ball using a ball mill. The mixture was primarily calcined at 1010° C. for 12 hours in an air atmosphere to prepare a lithium cobalt-doped oxide $Li_{1.02}Co_{0.94}Mg_{0.04}Al_{0.01}Ti_{0.01}O_2$ doped with Mg, Al and Ti.

Preparation Example 4

3 mol of MgO, 0.4 mol of $Al_2O_3$, 0.2 mol of $TiO_2$, $Co_3O_4$, and $Li_2CO_3$ were dry-mixed, and then calcined at 1,050° C. for 10 hours in a furnace to obtain a lithium cobalt-doped oxide $Li_{1.02}Co_{0.964}Mg_{0.03}Al_{0.004}Ti_{0.002}O_2$ doped with Mg, Al and Ti.

Preparation Example 5

3 mol of MgO, 0.5 mol of $Al_2O_3$, 0.5 mol of $TiO_2$, $Co_3O_4$ and $Li_2CO_3$ were dry-mixed, and then calcined at 1,050° C. for 10 hours in a furnace to obtain a lithium cobalt-doped oxide $Li_{1.02}Co_{0.96}Mg_{0.03}Al_{0.005}Ti_{0.005}O_2$ doped with Mg, Al and Ti.

Preparation Example 6

0.5 mol of MgO, 1 mol of $Al_2O_3$, 0.5 mol of $TiO_2$, $Co_3O_4$ and $Li_2CO_3$ were dry-mixed, and then calcined at 1,050° C. for 10 hours in a furnace to obtain a lithium cobalt-doped oxide $Li_{1.02}Co_{0.98}Mg_{0.005}Al_{0.01}Ti_{0.05}O_2$ doped with Mg, Al and Ti.

Preparation Example 7

A precursor particle of $(Co_{0.96}Mg_{0.03}Al_{0.005}Ti_{0.005})(OH)_2$ was obtained by dispersing in a mixed aqueous solution in which $Co_3(SO_4)_4$, sodium sulfate ($MgSO_4$), aluminum sulfate ($Al_2(SO_4)_3$) and titanium sulfate ($Ti(SO_4)_2$) were mixed at a ratio of Co:Mg:Al:Ti=0.96:0.03:0.005:0.005, and co-precipitating the result using sodium hydroxide.

41 g of $LiOH.H_2O$ was added to 100 g of the precursor so that the molar ratio of the total elements in the particle became the molar ratio of Li:M (Co, Mg, Al, Ti)=1.02:1, and then mixed with a zirconia ball using a ball mill. The mixture was primarily calcined at 1010° C. for 12 hours in an air atmosphere to prepare a lithium cobalt-doped oxide $Li_{1.02}Co_{0.96}Mg_{0.03}Al_{0.005}Ti_{0.005}O_2$ doped with Mg, Al and Ti.

Preparation Example 8

1.3 mol of MgO, 0.1 mol of $Al_2O_3$, 0.2 mol of $TiO_2$, $Co_3O_4$ and $Li_2CO_3$ were dry-mixed, and then calcined at 1,050° C. for 10 hours in a furnace to obtain a lithium cobalt-doped oxide $Li_{1.02}Co_{0.984}Mg_{0.013}Al_{0.001}Ti_{0.002}O_2$ doped with Mg, Al and Ti.

Example 1

200 g of the lithium cobalt-doped oxide prepared in Preparation Example 1, 0.6 mol of MgO, 1 mol of $Al_2O_3$, 1 mol of $TiO_2$, $Co_3O_4$ and $Li_2CO_3$ were dry-mixed and then calcined at 950° C. for 10 hours in a furnace to prepare a positive electrode active material having a core-shell structure in which a lithium cobalt-doped oxide $Li_{1.02}Co_{0.944}Mg_{0.006}Al_{0.04}Ti_{0.01}O_2$ doped with Mg, Al and Ti was formed in the core of $Li_{1.02}Co_{0.94}Mg_{0.04}Al_{0.01}Ti_{0.01}O_2$.

Example 2

$Al_2O_3$ having an average particle size of 50 nm was further added to the lithium cobalt-doped oxide prepared in Example 1 in an amount of 0.05% by weight based on the total mass of the positive electrode active material, and then secondarily calcinated at 570° C. for 6 hours to form a coating layer of aluminum (500 ppm). At this time, the aluminum coating layer was formed to have an average thickness of approximately 50 nm.

Example 3

200 g of the lithium cobalt-doped oxide prepared in Preparation Example 5, 3 mol of MgO, 0.5 mol of $Al_2O_3$, 0.5 mol of $TiO_2$, $Co_3O_4$ and $Li_2CO_3$ were dry-mixed and then calcined at 950° C. for 10 hours in a furnace to prepare a positive electrode active material having a core-shell structure in which a lithium cobalt-doped oxide $Li_{1.02}Co_{0.977}Mg_{0.008}Al_{0.01}Ti_{0.005}O_2$ doped with Mg, Al and Ti was formed in the core of $Li_{1.02}Co_{0.96}Mg_{0.03}Al_{0.005}Ti_{0.005}O_2$.

Example 4

$Al_2O_3$ having an average particle size of 50 nm was further added to the lithium cobalt-doped oxide prepared in Example 3 in an amount of 0.05% by weight based on the total mass of the positive electrode active material, and then secondarily calcinated at 570° C. for 6 hours to form a coating layer of aluminum (500 ppm). At this time, the aluminum coating layer was formed to have an average thickness of approximately 50 nm.

Example 5

200 g of the lithium cobalt-doped oxide prepared in Preparation Example 1, 0.4 mol of MgO, 1 mol of $Al_2O_3$, 2 mol of $TiO_2$, $Co_3O_4$ and $Li_2CO_3$ were dry-mixed and then calcined at 950° C. for 10 hours in a furnace to prepare a positive electrode active material having a core-shell structure in which a lithium cobalt-doped oxide $Li_{1.02}Co_{0.944}Mg_{0.004}Al_{0.01}Ti_{0.02}O_2$ doped with Mg, Al and Ti was formed in the core of $Li_{1.02}Co_{0.94}Mg_{0.04}Al_{0.01}Ti_{0.01}O_2$.

Comparative Example 1

200 g of the lithium cobalt-doped oxide prepared in Preparation Example 2, 0.076 g of MgO, 0.267 g of $Al_2O_3$, 0.43 g of $TiO_2$, 50 g of $Co_3O_4$ and 20.475 g of $Li_2CO_3$ were dry-mixed and then calcined at 950° C. for 10 hours in a furnace to prepare a positive electrode active material having a core-shell structure in which a lithium cobalt-doped oxide $Li_{1.02}Co_{0.957}Mg_{0.013}Al_{0.02}Al_{0.02}Ti_{0.01}O_2$ doped with Mg, Al and Ti was formed in the core of $Li_{1.02}Co_{0.944}Mg_{0.006}Al_{0.04}Ti_{0.01}O_2$.

Comparative Example 2

200 g of the lithium cobalt-doped oxide prepared in Preparation Example 4, 0.07 g of MgO, 0.53 g of $Al_2O_3$, 1.73 g of $TiO_2$, 50 g of $Co_3O_4$ and 20.475 g of $Li_2CO_3$ were dry-mixed and then calcined at 950° C. for 10 hours in a furnace to prepare a positive electrode active material having a core-shell structure in which a lithium cobalt-doped oxide $Li_{1.02}Co_{0.908}Mg_{0.012}Al_{0.04}Ti_{0.04}O_2$ doped with Al and Ti was formed in the core of $Li_{1.02}Co_{0.964}Mg_{0.03}Al_{0.004}Ti_{0.002}O_2$.

Comparative Example 3

200 g of the lithium cobalt-doped oxide prepared in Preparation Example 6, 0.48 g of MgO, 0.13 g of $Al_2O_3$, 0.216 g of $TiO_2$, 50 g of $Co_3O_4$ and 20.475 g of $Li_2CO_3$ were dry-mixed and then calcined at 950° C. for 10 hours in a furnace to prepare a positive electrode active material having a core-shell structure in which a lithium cobalt-doped oxide $Li_{1.02}Co_{0.97}Mg_{0.02}Al_{0.005}Ti_{0.005}O_2$ doped with Mg, Al and Ti was formed in the core of $Li_{1.02}Co_{0.98}Mg_{0.005}Al_{0.01}Ti_{0.005}O_2$.

Table 1 below shows the average oxidation number (up to the first decimal point) of the doping elements of Examples 1 to 5 and Comparative Examples 1 to 3 and the ratio thereof.

TABLE 1

|  | OC | OS | t |
|---|---|---|---|
| Example 1 | 2.5 | 3.1 | 0.81 |
| Example 2 | 2.5 | 3.1 | 0.81 |
| Example 3 | 2.4 | 2.9 | 0.83 |
| Example 4 | 2.4 | 2.9 | 0.83 |
| Example 5 | 2.5 | 3.5 | 0.72 |
| Comparative Example 1 | 3.1 | 2.9 | 1.07 |
| Comparative Example 2 | 2.2 | 3.3 | 0.67 |
| Comparative Example 3 | 3 | 2.5 | 1.2 |

Tables 2 and 3 below show the content of the doping elements of Examples 1 to 5 and Comparative Examples 1 to 3 and the content ratio thereof.

TABLE 2

|  | CM1 | CM2 | CM3 | r |
|---|---|---|---|---|
| Example 1 | 4 | 1 | 1 | 2 |
| Example 2 | 4 | 1 | 1 | 2 |
| Example 3 | 3 | 0.5 | 0.5 | 3 |
| Example 4 | 3 | 0.5 | 0.5 | 3 |
| Example 5 | 4 | 1 | 1 | 2 |
| Comparative Example 1 | 0.6 | 4 | 1 | 0.12 |
| Comparative Example 2 | 3 | 0.4 | 0.2 | 5 |
| Comparative Example 3 | 0.5 | 1 | 0.5 | 0.33 |

TABLE 3

|  | CM1' | CM2' | CM3' | r' |
|---|---|---|---|---|
| Example 1 | 0.6 | 4 | 1 | 0.12 |
| Example 2 | 0.6 | 4 | 1 | 0.12 |
| Example 3 | 0.8 | 1 | 0.5 | 0.53 |
| Example 4 | 0.8 | 1 | 0.5 | 0.53 |
| Example 5 | 0.4 | 1 | 1 | 0.2 |
| Comparative Example 1 | 1.3 | 2 | 1 | 2.3 |
| Comparative Example 2 | 1.2 | 4 | 4 | 0.15 |
| Comparative Example 3 | 2 | 0.5 | 0.2 | 2.85 |

Experimental Example 1

The oxide particles prepared in Examples 1 and 3 and Comparative Examples 1 to 3 were used as a positive electrode active material, PVdF as a binder, and a natural graphite as a conductive material. The positive electrode active material: binder: conductive material were thoroughly mixed with NMP so that the weight ratio became 96:2:2, then applied to an Al foil having a thickness of 20 μm, and then dried at 130° C. to prepare a positive electrode. Lithium foil was used as a negative electrode, and an electrolyte containing IM of $LiPF_6$ in a solvent of EC:DMC:DEC=1:2:1 was used to prepare half-coin cells.

The half coin cells thus prepared were charged at 25° C. with 0.5 C at an upper limit voltage of 4.55 V and again discharged with 1.0 C at a lower limit voltage of 3 V, the procedures of which were set as one cycle. The charge/discharge were repeated 50 times. The capacity retention at the fifth cycle was measured and the results are shown in FIG. 1.

Referring to FIG. 1, the battery using the positive electrode active materials of Examples according to the present invention showed a capacity retention of 90% or more, whereas the battery using the positive electrode active material of Comparative Examples not satisfying either condition showed the capacity retention of about 85% or less, which was not good in lifetime characteristic. Thus, it can be seen that Examples satisfying the conditions of the present invention had higher high-voltage and high-temperature lifetime characteristics, from which can be expected that as the cycle progresses, the difference will be further accelerated.

While the present invention has been described with reference to exemplary embodiments, it will be apparent to those having ordinary knowledge in the relevant field that various applications and modifications can be made within the scope of the present invention based on the above contents.

INDUSTRIAL APPLICABILITY

As set forth above, in the positive electrode active material according to the present invention, three kinds of dopants are doped each independently onto the lithium cobalt doped oxide of the core and the lithium cobalt-doped oxide of the shell, and the average oxidation number ratio of the doped dopants satisfies the condition (1) of claim 1. Thereby, the structural stability of the crystal structure is improved even in the operation voltage range exceeding 4.5 V and the crystal structure is maintained. In addition, the structural stability is maintained even at a high temperature, and the lifetime characteristics are improved.

The invention claimed is:

1. A positive electrode active material for a lithium secondary battery comprising a lithium cobalt-doped oxide having a core-shell structure,
wherein the lithium cobalt-doped oxide of a core has a composition of the following Chemical Formula (1) and the lithium cobalt-doped oxide of a shell has a composition of the following Chemical Formula (2):

  (1)

wherein in Chemical Formula 1,
M1, M2 and M3 are each independently one element selected from the group consisting of Ti, Mg, Al, Zr, Ba, Ca, Ta, Nb, Mo, Zn, Si, and V;
$0.95 \leq a \leq 1.05$;
$0 < x \leq 0.04$, $0 < y \leq 0.04$, and $0 < z \leq 0.04$ $$Li_bCo_{1-s-t-w}M1'_sM2'_tM3'_wO_2 \quad (2)$$

wherein in Chemical Formula 2,
M1', M2' and M3' are each independently one element selected from the group consisting of Ti, Mg, Al, Zr, Ba, Ca, Ta, Nb, Mo, Zn, Si, and V;
$0.95 \leq b \leq 1.05$;
$0 < s \leq 0.04$, $0 < t \leq 0.04$, and $0 < w \leq 0.04$,
wherein the lithium cobalt-doped oxide of the core and the lithium cobalt-doped oxide of the shell include each independently three kinds of dopants and satisfy the following (a) or (b):
(a) a ratio between the average oxidation number of the dopants present in the core and the average oxidation number of the dopants present in the shell satisfies the following condition (1);

  (1)

wherein, OC is the average oxidation number of the dopants present in the core, and OS is the average oxidation number of the dopants present in the shell, or
(b) the dopants of the core are a metal (M1) having an oxidation number of +2, a metal (M2) having an oxidation number of 1-3 and a metal (M3) having a oxidation number of +4, and a content of M1 M2 and M3 satisfy the following condition (2) based on the molar ratio; the dopants of the shell are a metal(M1') having an oxidation number of +2, a metal(M2') having an oxidation number of +3 and a metal(M3') having a oxidation number of +4, and a content of M1', M2' and M3' satisfy the following condition (3) based on the molar ratio:

$$2 \leq r(\text{molar ratio}) = CM1/(CM2+CM3) \leq 3 \quad (2)$$

$$0.5 \leq r'(\text{molar ratio}) = CM1'(CM2'+CM3') < 2 \quad (3)$$

wherein CM1 is the content of M1, CM2 is the content of M2, CM3 is the content of M3, CM1' is the content of M1', CM2' is the content of M2', and CM3' is the content of M3'.

2. The positive electrode active material according to claim 1, wherein in (a), t (molar ratio) satisfies the condition of $0.8 \leq t < 0.95$.

3. The positive electrode active material according to claim 1, wherein in (b), r(molar ratio) satisfies the condition of $2 \leq r \leq 2.5$, and r' (molar ratio) satisfies the condition of $0.5 \leq r' \leq 1.5$.

4. The positive electrode active material according to claim 1, wherein the lithium cobalt-doped oxide having a core-shell structure maintains the crystal structure without phase change in a range where the positive electrode potential during full charge is higher than 4.5 V on the basis of a Li potential.

5. The positive electrode active material according to claim 1, wherein
the M1 and M1' are each independently one element selected from the group consisting of Mg, Ca, and Ba;
the M2 and M2' are each independently one element selected from the group consisting of Ti, Al, Ta and Nb; and
the M3 and M3' are each independently selected from the group consisting of Ta, Nb, and Mo and are elements different from M2 and M2'.

6. The positive electrode active material according to claim 1, wherein the thickness of the shell is 50 to 2000 nm.

7. The positive electrode active material according to claim 1, wherein $Al_2O_3$ having a thickness of 50 nm to 100 nm is coated onto the surface of the shell.

8. A method for producing a lithium cobalt-doped oxide having a core-shell structure of the positive electrode active material according to claim 1, the method comprising:
(i) preparing a doped cobalt precursor containing three kinds of dopants by co-precipitation;
(ii) mixing the doped cobalt precursor and a lithium precursor, and subjecting them to a primary calcination to prepare core particles; and
(iii) mixing the core particles, the cobalt precursor, the lithium precursor, and the three kinds of dopant precursors, and subjecting them to a secondary calcination to form a shell on the core particle surface, thereby preparing a lithium cobalt-doped oxide having a core-shell structure.

9. The method according to claim 8, wherein in the preparing a doped cobalt precursor, dopant element-containing salts and cobalt salts are dissolved in water to obtain a solution, and then the solution is converted to a basic atmosphere and subjected to a co-precipitation to prepare a doped cobalt oxide as the doped cobalt precursor.

10. A method for producing a lithium cobalt-doped oxide having a core-shell structure of the positive electrode active material according to claim 1, the method comprising:
(i) mixing a cobalt precursor, a lithium precursor, and three kinds of dopant precursors and subjecting them to a primary calcination to prepare core particles; and
(ii) mixing the core particles, the cobalt precursor, the lithium precursor, and the three kinds of dopant precursors independently of the primary calcination, and subjecting them to a secondary calcination to form a shell on core particle surface, thereby preparing a lithium cobalt-doped oxide having a core-shell structure.

11. The method according to claim 8, wherein the dopants of the three kinds of dopant precursors have different oxidation numbers.

12. The method according to claim 8, wherein the lithium cobalt-doped oxide having a core-shell structure satisfies the following conditions (a) and (b):
(a) the ratio between the average oxidation number of the dopants present in the core and the average oxidation number of the dopants present in the shell satisfies the following condition (1);

$$0.7 \leq t(\text{molar ratio}) = OC/OS < 0.95 \quad (1)$$

wherein, OC is the average oxidation number of the dopants present in the core, and OS is the average oxidation number of the dopants present in the shell, or (b) the dopants of the core are a metal (M1) having an oxidation number of +2, a metal (M2) having an oxidation number of +3 and a metal (M3) having a oxidation number of +4, the contents of M1, M2, and M3 satisfy the following condition (2) based on the molar ratio; the dopants of the shell are a metal(M1') having an oxidation number of +2, a metal(M2') having an oxidation number of +3 and a metal(M3') having a oxidation number of +4, and the contents of M1', M2' and M3' satisfy the following condition (3) based on the molar ratio:

$$2 \leq r(\text{molar ratio}) = CM1/(CM2+CM3) \leq 3 \quad (2)$$

$$0.5 \leq r'(\text{molar ratio}) = CM1'/(CM2'+CM3') < 2 \quad (3)$$

wherein CM1 is the content of M1, CM2 is the content of M2, CM3 is the content of M3, CM1' is the content of M1', CM2' is the content of M2', and CM3' is the content of M3'.

13. The method according to claim 8, wherein the primary calcination is performed at a temperature of 850° C. to 1100° C. for 8 to 12 hours, and the secondary calcination is performed at a temperature of 700° C. to 1100° C. for 5 to 12 hours.

14. A positive electrode in which a positive electrode mixture containing the positive electrode active material according to any one of claim 1, a conductive material, and a binder is applied to a current collector.

15. A secondary battery comprising the positive electrode according to claim 14.

* * * * *